(12) United States Patent
Maldonado et al.

(10) Patent No.: US 7,257,366 B2
(45) Date of Patent: Aug. 14, 2007

(54) SYSTEM AND METHOD FOR TEACHING A NEW LANGUAGE

(75) Inventors: Premier M. Maldonado, Hartsdale, NY (US); Jacqueline Batista, Hartsdale, NY (US)

(73) Assignee: Osmosis LLC, Hartsdale, NY (US)

( * ) Notice: Subject to any disclaimer, the term of this patent is extended or adjusted under 35 U.S.C. 154(b) by 613 days.

(21) Appl. No.: 10/722,963

(22) Filed: Nov. 26, 2003

(65) Prior Publication Data

US 2005/0112531 A1  May 26, 2005

(51) Int. Cl.
*G09B 11/00* (2006.01)
(52) U.S. Cl. ........................................ 434/317
(58) Field of Classification Search ............. 434/156, 434/157, 167, 169, 185
See application file for complete search history.

(56) References Cited

U.S. PATENT DOCUMENTS 5,275,569 A * 1/1994 Watkins ..................... 434/157
6,341,958 B1 * 1/2002 Zilberman ................. 434/157
6,884,076 B2 * 4/2005 Clark et al. ................ 434/172
7,052,278 B2 * 5/2006 Johnson et al. ........... 434/156
2003/0224334 A1 * 12/2003 Boys ......................... 434/169

* cited by examiner

*Primary Examiner*—Kathleen Mosser
(74) *Attorney, Agent, or Firm*—Day Pitney LLP (57) ABSTRACT

A first and a second language are presented in audiovisual and printed format with equal emphasis, so that either language can be learned. Moreover, the audiovisual and the printed format are presented in consistent format to reinforce the learning experience. The printed material may include a slider with a picture consistent with the image shown on the audiovisual format, and the slider can be moved to selectively reveal the spelling of the word in either the first or the second language. Other items, such as electronic books, toys and apparel can be used to present consistent images to reinforce the bilingual training.

3 Claims, 13 Drawing Sheets

SYSTEM AND METHOD FOR TEACHING A NEW LANGUAGE

BACKGROUND OF THE INVENTION

1. Field of the Invention

This invention pertains to a system and method for presenting and teaching a new language. In particular, this invention relates to the presentation of two languages with equal emphasis.

2. Background of the Invention

It is well known that children are able to learn multiple languages without effort. It is also known that as a person grows older and leaves childhood, it becomes progressively more difficult to gain fluency in a new language. However, most methods for teaching a new language differentiate between the two languages wherein prior knowledge of a first language is used to teach the second language. These methods typically cannot be used in the reverse circumstance when a speaker has prior knowledge in the second language but wishes instruction in the first language. This unnecessarily reduces the flexibility of a teaching method. Moreover, the categorization of a "primary language", "secondary language" or "foreign language", may not be preferred by some speakers, particularly parents imparting values to their children.

Additionally, many methods for teaching a new language do not reinforce the spoken word with the written word in a consistent manner and do not reinforce the correspondence of the spoken word and the written word in the original language in a consistent manner.

For instance, the original "Baby Einstein" video contained songs and rhymes in various languages in addition to music and sound effect for children up to 36 months of age. However, there is no attempt to make a written or graphical visual reference to a word, song or rhyme in any language. Instead, it uses toys and other images to keep a child's visual attention while the audio plays the intended music, songs or rhyme. The book, "Baby Einstein Nursery", was not a direct companion to the video and would typically take a sentence of a first language and translate it into several "foreign" languages. A later version of "Baby Einstein". A later DVD version with a video supplemental section tried to connect some of the images of the video with an education flashcard that, as in the video and book, could be seen in one of several "foreign" languages. However, an immersive technique was used and the video did not use the same visual style as the book. Additionally, there was no consistency of the presentation format with that of the video or book to reinforce any language lessons learned.

Brainy Baby, formerly known as Small Fry Production created a number of videos for children, including "Bilingual Baby" (later renamed "Brainy Baby Spanish") which attempts to teach a child a language. The immersive teaching technique mainly comprises live action video footage, with a few graphic sections, in which typically three words are presented in an order later to be used in a sentence. This is an immersive technique with only the spoken immersive language which is indicated on the tape (Spanish, German, Italian, etc.). The non-English word is presented, then the English translation is removed, leaving only the word to be learned visually in the screen. At all times, these words are spoken only in the respective immersive language while the audio in the background is usually classical.

The "Just Look 'n Learn Spanish Picture Dictionary" includes words in both Spanish and English, with no presentation beyond the written page.

The "Fun with Languages" presents language in a bilingual format with equal emphasis to the target language and English through various puppets. The format of the video and the coloring book is not consistent. It does not use a flashcard approach, but rather concentrates on the words alone and their relationship with the colors.

Other examples of prior art language instruction methods or devices include books such as "Let's Play—Vamos a Jugar" from "Chubby/Little Simon", "Let's Learn Spanish Dictionary" from "Passport Books", "My First Hundred Words in Spanish" from "Paragon Publishing" or other books from such publishers as "Little/Brown Co."; flashcard systems, such as those produced by "Penton Overseas, Inc."; television programs such as "Miffy" from "Big Tent Entertainment" (shown in Europe) or "Dora the Explorer".

Some other examples of prior art are U.S. Pat. No. 6,565,358 entitled "Language Teaching System" issued on May 20, 2003 to Thomas; U.S. Pat. No. 6,435,876 entitled "Interactive Learning of a Foreign Language" issued on Aug. 20, 2002 to Chen; and U.S. Pat. No. 6,409,510 entitled "Method for Learning a Foreign Language" issued on Jun. 25, 2002 to Chen.

OBJECTS AND SUMMARY OF THE INVENTION

It is therefore an object of the present invention to provide a method and apparatus for the teaching a language wherein two languages—the language to be learned, and the language which is already learned—are presented with equal emphasis.

It is therefore a further object of the present invention to provide a method and apparatus for the teaching of a language wherein either of two languages can be taught by the method and apparatus based on prior knowledge of the other language.

It is therefore a still further object of the present invention to provide a method and apparatus for the teaching of a language wherein the spoken word is reinforced with the written word in a consistent manner, using a multi-sensory approach to learning, i.e., engaging as many of the senses as possible at one time.

At the outset, it must be noted here that the terminology "first language" versus "second language" is an arbitrary construct for purposes of describing the method and apparatus of the invention and is not to be construed as a preference for either language, as both languages are intentionally treated with equal emphasis in a bilingual environment.

These and other objects are attained by providing an audio video output, such as is provided by a videotape or DVD, wherein words are spoken in a first language and then spoken in a second language. Alternately, a CD-ROM can be used to provide audio output. Typically, the speaker of the first language will be spoken in a voice which is easily distinguishable from the voice in which the second language is spoken. Using speakers of different genders is a pleasant way to provide this distinction. Additionally, printed material is provided wherein written words are presented with the same background color as that shown on the video. The printed material may include sliders incorporated into the page so that the child can selectively move the slider to expose the word in either language which corresponds to a picture on the slider. For example, the slider may have a picture of a house, and the slider can be moved selectively to expose the word "house" (in English) or the word "casa" (in Spanish).

Particularly for smaller children, the video sessions of presentation of the two languages may interspersed with activities to maintain the interest of the children, such as pictures of the items which were introduced during the bilingual sessions, pictures of children at play or songs sung in the given languages.

Additionally, a coloring book may be provided which includes outlines of the same pictures shown on the video and in the book, with the word of both languages which corresponds to the picture. Further, a placemat may be provided which includes images substantially identical with those found in the coloring book.

BRIEF DESCRIPTION OF THE DRAWINGS

Further objects and advantages will become apparent from the following description and claims and from the accompanying drawings, wherein:

DETAILED DESCRIPTION OF THE PREFERRED EMBODIMENT

Figure 1:
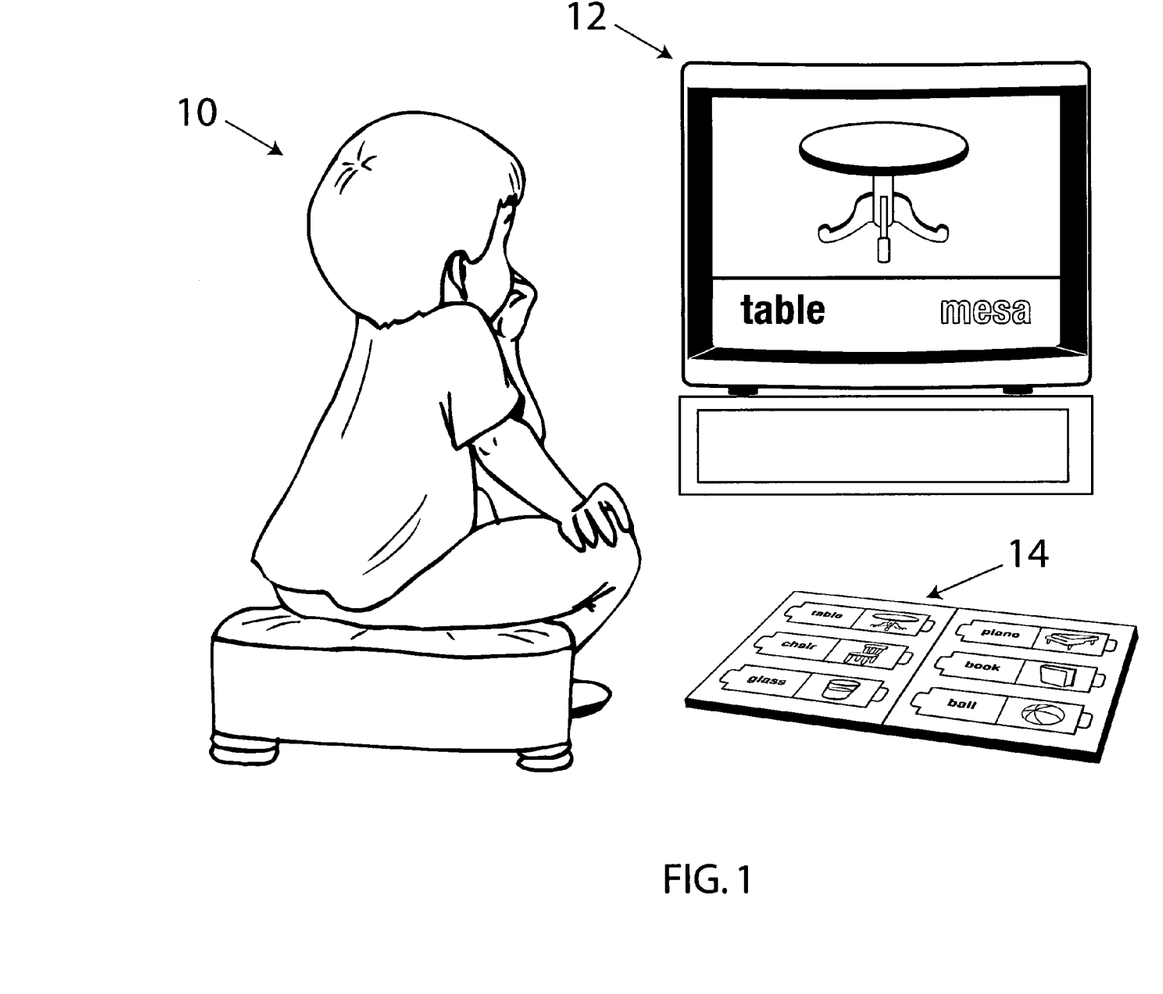
FIG. 1 is a picture of a person watching the video of the present invention, while referring to the book of the present invention.

Referring now to the drawings in detail, wherein like numerals indicate like elements throughout the several views, one sees from FIG. 1 that the child 10 is watching the television 12 for an audiovisual program. The audiovisual program may be supplied by a videotape, a DVD, a television broadcast through any number of media, or any equivalent methods which may be developed.

The audiovisual program includes sessions of bilingual presentation. The sessions of bilingual presentation will include the visual presentation, typically a still animation, of a common item or thing, such as a "house". The audio portion will include a first tone or audio cue to introduce the picture, a first person speaking the word in a first language, such as "house" in English, followed by a second tone or audio cue (which may have the same or different tonal characteristics as the first tone), and a second person speaking the corresponding word in a second language, such as "casa" in Spanish. The video will include, typically in the lower portion, the printed word corresponding to the word being spoken. There will be a band of a background color (such as red, blue, yellow or green, primary or otherwise simple colors which appeal to children) with the word from the first language printed in a first color (such as black) and the word from the second language printed in a second color (such as white). The printed word from both languages will be constantly displayed during audio presentation of the words from both languages.

As stated above, the languages are intended to be presented with equal emphasis in a bilingual environment, and any reference to "first language" or "second language" is simply an arbitrary construct for the disclosure and claiming of the present invention.

Interspersed with the sessions of bilingual presentation are animated or videotaped sessions of children's activities which typically include images of the items or things introduced in the sessions of bilingual presentation. For instance, after the sessions of bilingual presentation (in a consistent format) have introduced the words "niño", "niña" and "pelota" ("boy", "girl" and "ball"), there may be an engaging video presentation of girls and boys playing with balls, in order to evoke the child into using the words of the new language.

Figure 2:
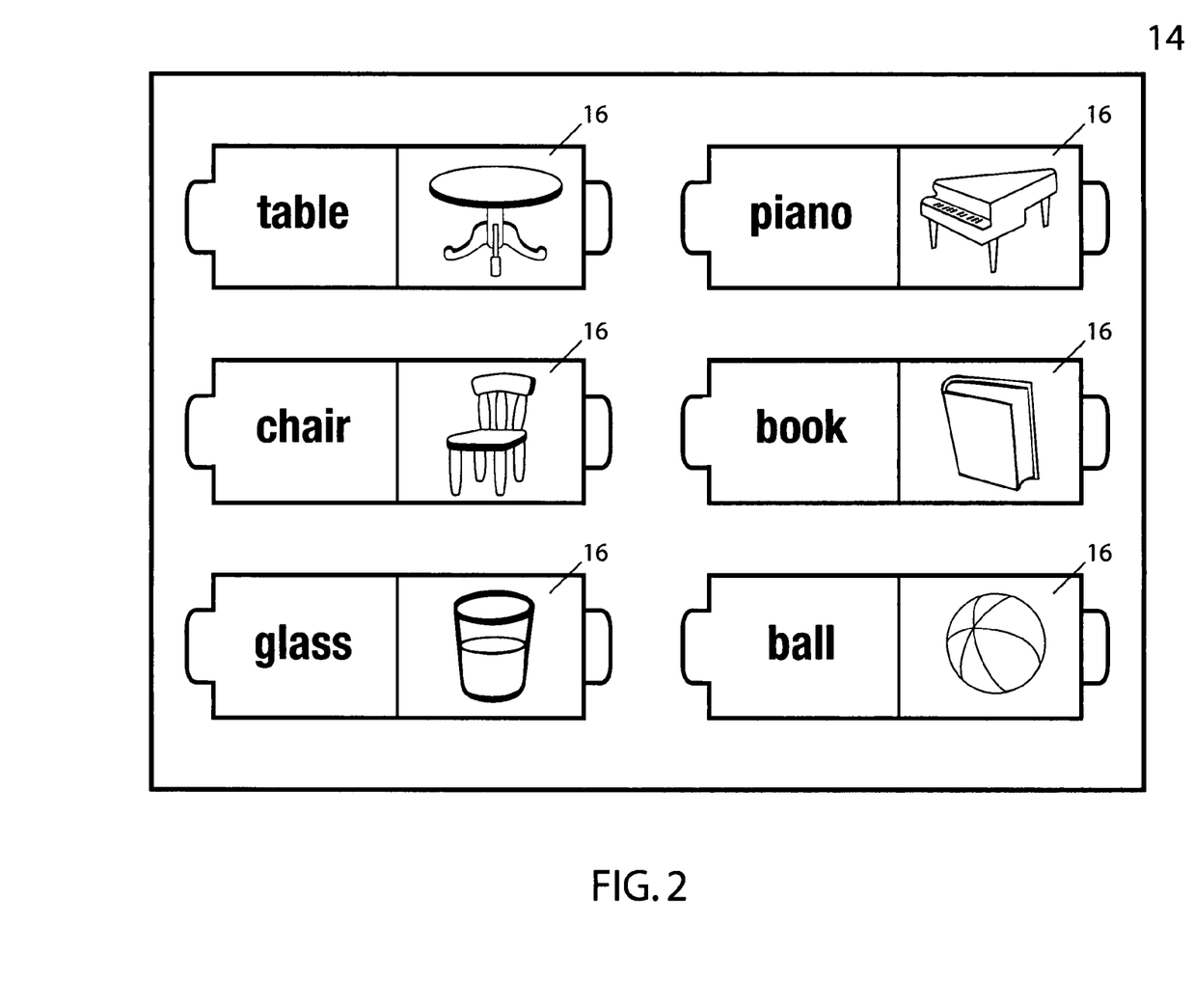
FIG. 2 is a picture of the book of the present invention with the sliders in a first position to reveal the corresponding words of the first language.
Figure 3:
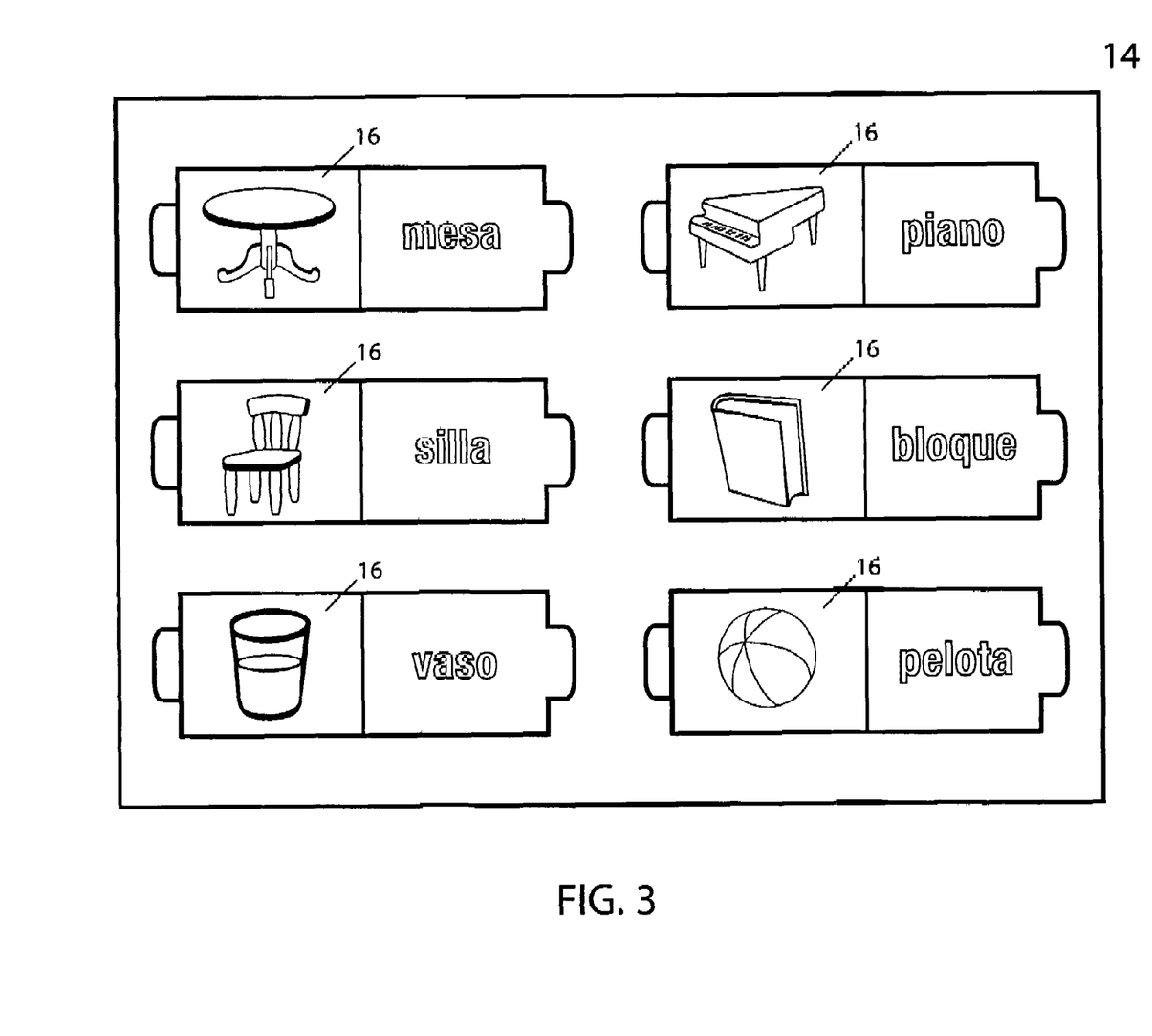
FIG. 3 is a picture of the book of the present invention with the sliders in a second position to reveal the corresponding words of the second language.

Additionally, the child 10 refers to the book 14 which is shown in FIGS. 2 and 3. The book 14 includes at least a substantial portion of the images, items or things shown on the video during the sessions of bilingual presentation. The book 14 includes a plurality of sliders 16 which include the pictures corresponding to the spoken words, such as a "casa" or "house", and the slider 16 can be moved to expose either the written word "casa" or the written word "house". The background color upon which the pairs of words are printed typically corresponds to the background color upon which the words are presented on the video. Moreover, this background color typically is varied regularly for each successive word pair. For instance, the word pair "house" and "casa" will have a background color of green, the word pair "car" and "carro" will have a background color of "red", and the word pair of "door" and "puerta" will have a background color of "blue". This pattern of colors will repeat for subsequent word pairs.

Additionally, it is envisioned that book 14 could be implemented as an electronic "talking" toy or as a computer program which would produce similar or equivalent images.

Figure 4:
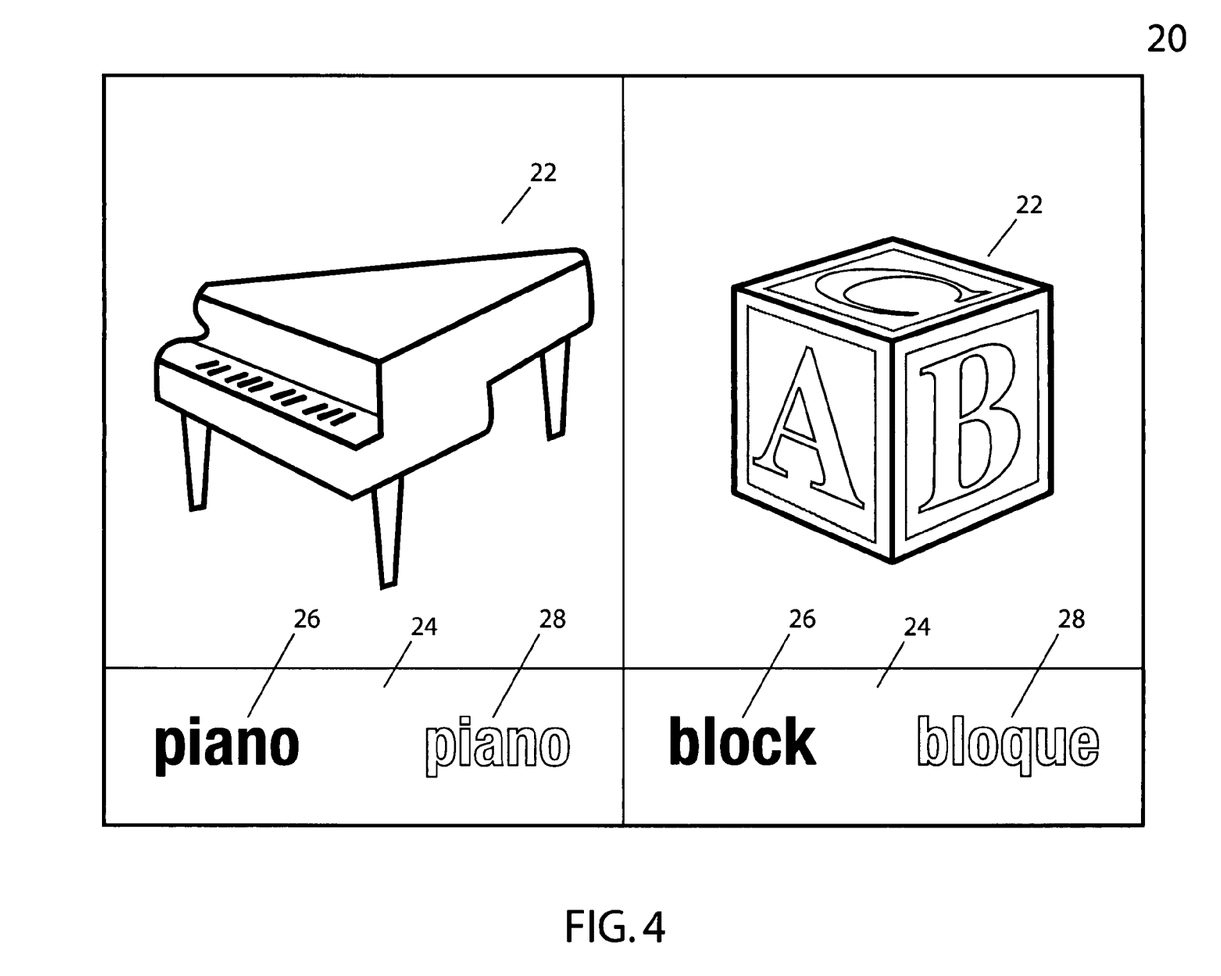
FIG. 4 is a picture of the coloring book of the present invention.

The coloring book 20 of FIG. 4 includes gray scale images 22 corresponding to those on the video. Below each image 22 is a footer 24 in gray, with the word 26 corresponding to the image in the first language printed in black, with the word 28 corresponding to the image in the second language printed in white. The images of the coloring book are preferably presented in the same order as the images are presented in the bilingual sessions of the video.

Figure 5:
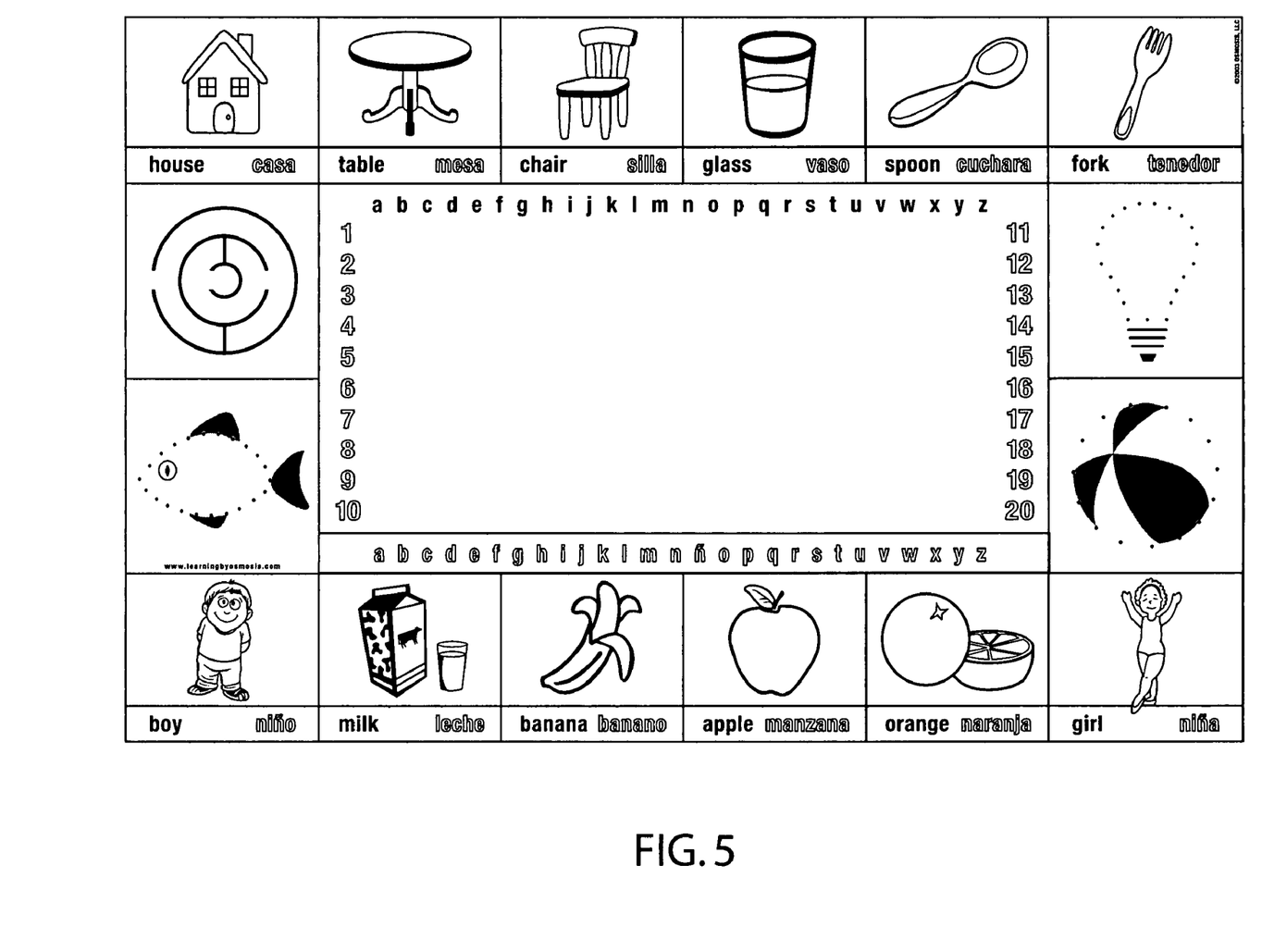
FIG. 5 is a picture of the placemat of the present invention.

The placemat 30 of FIG. 5 includes a collection of images corresponding to a substantial portion of the images of the video and the coloring book.

Figure 6:
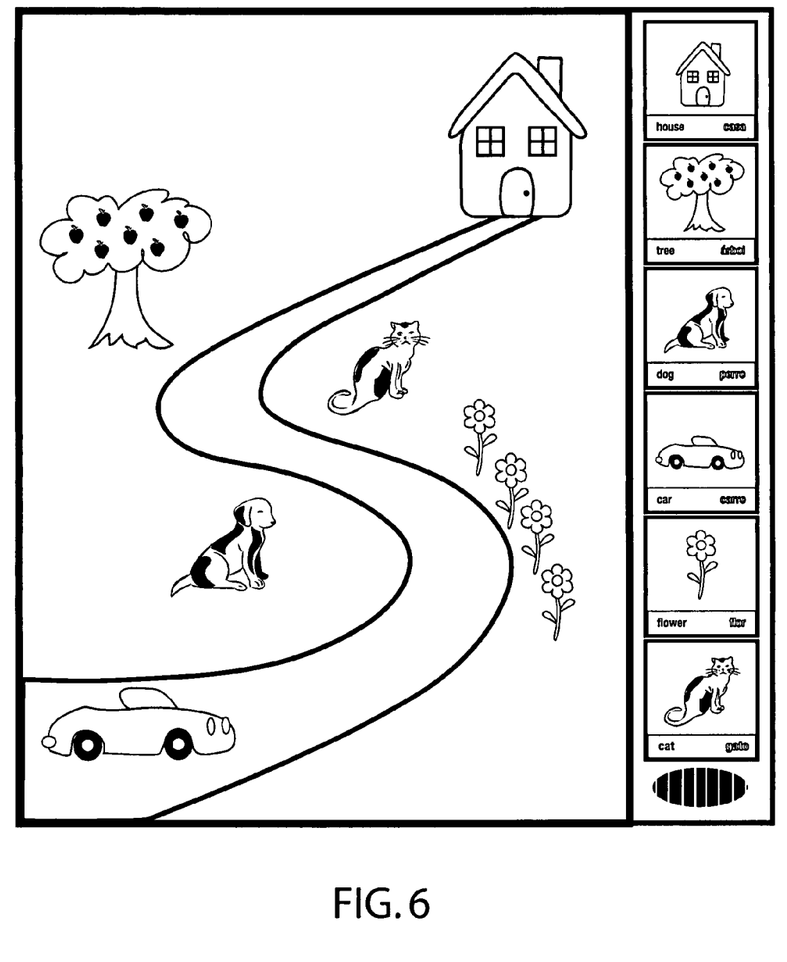
FIG. 6 is a picture of a first electronic book embodiment of the present invention.
Figure 7:
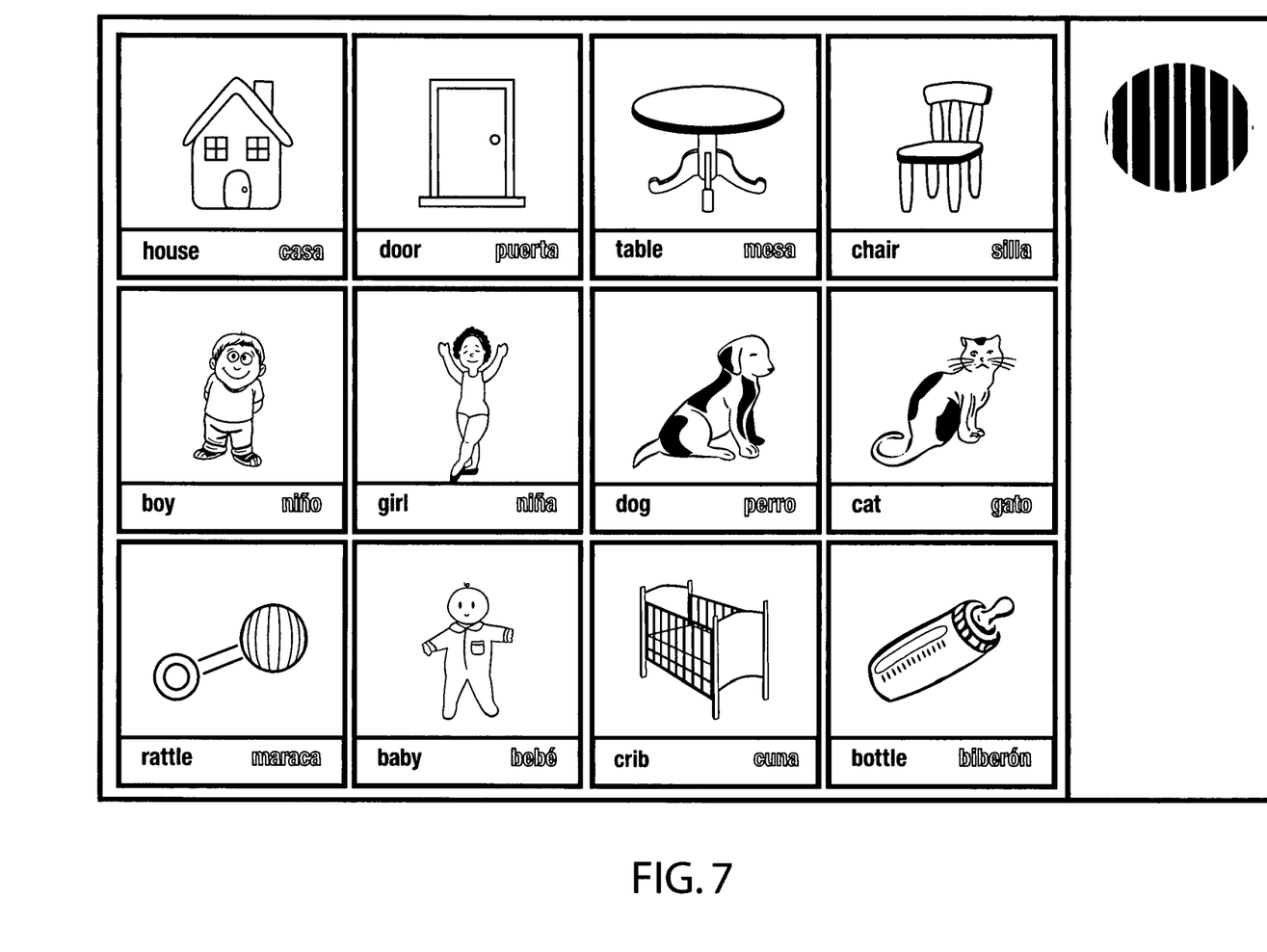
FIG. 7 is a picture of a second electronic book embodiment of the present invention.
Figure 8:
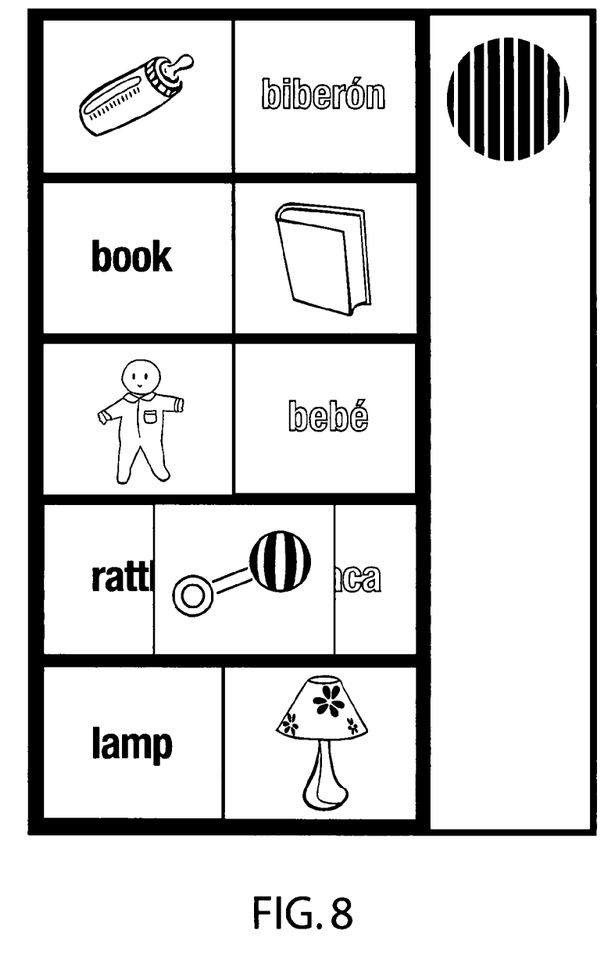
FIG. 8 is a picture of a third electronic book embodiment of the present invention.
Figure 9:
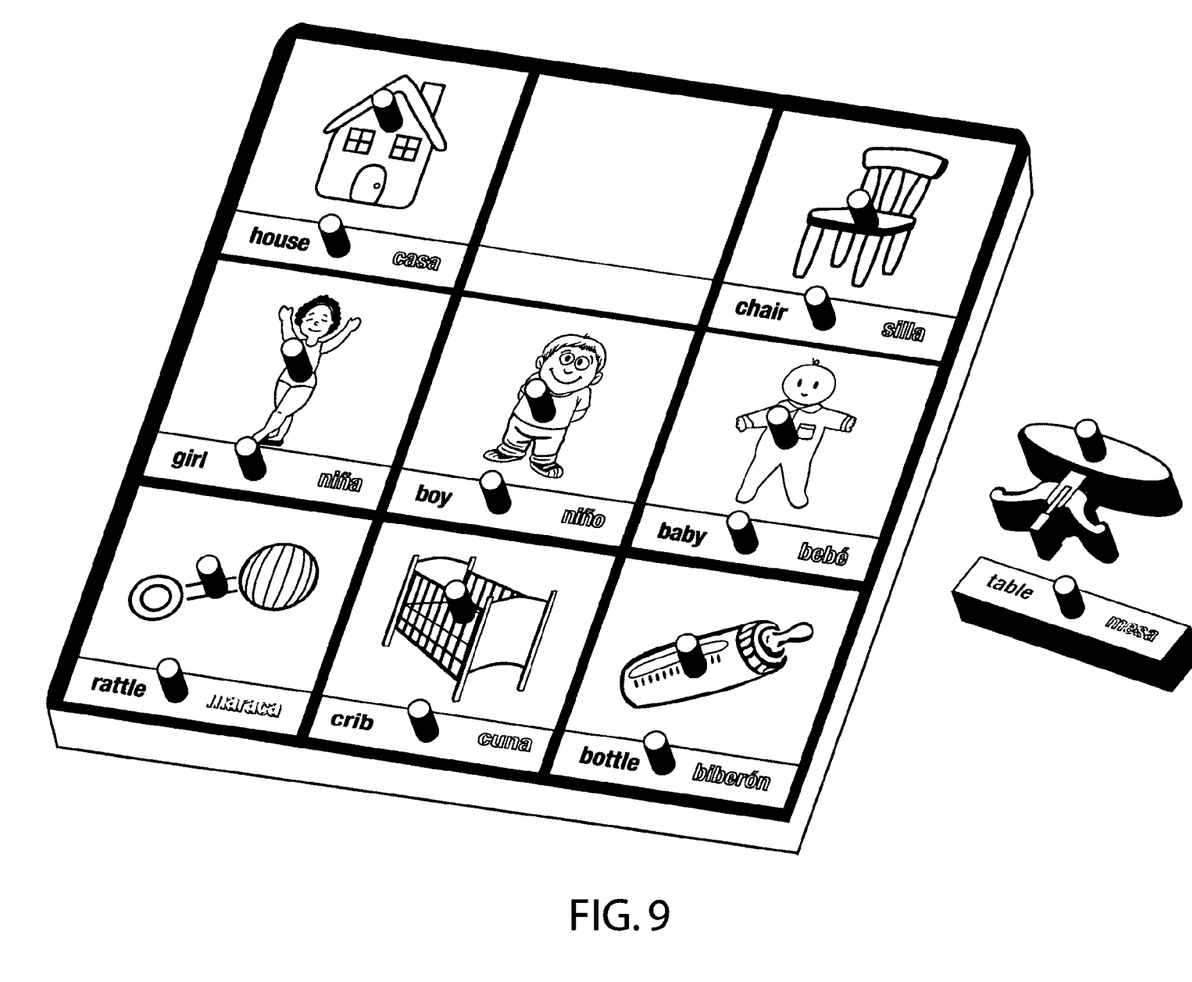
FIG. 9 is a picture of a puzzle embodiment of the present invention.
Figure 10:
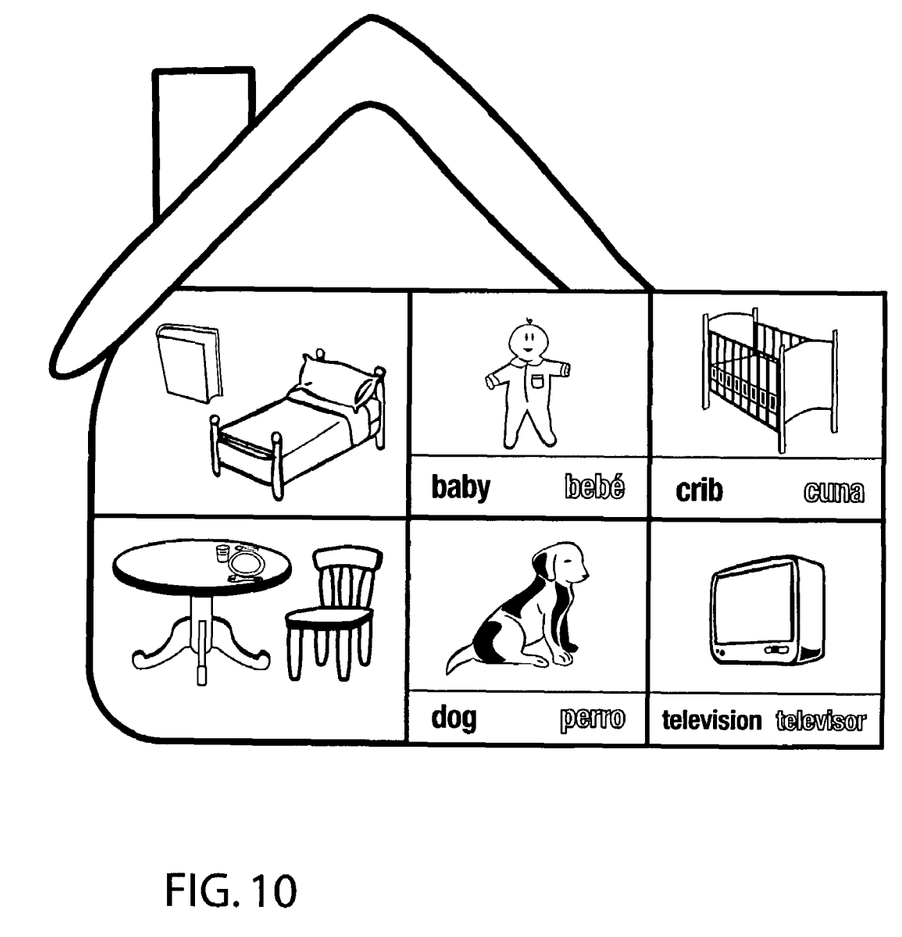
FIG. 10 is a picture of a first toy embodiment of the present invention.
Figure 11:
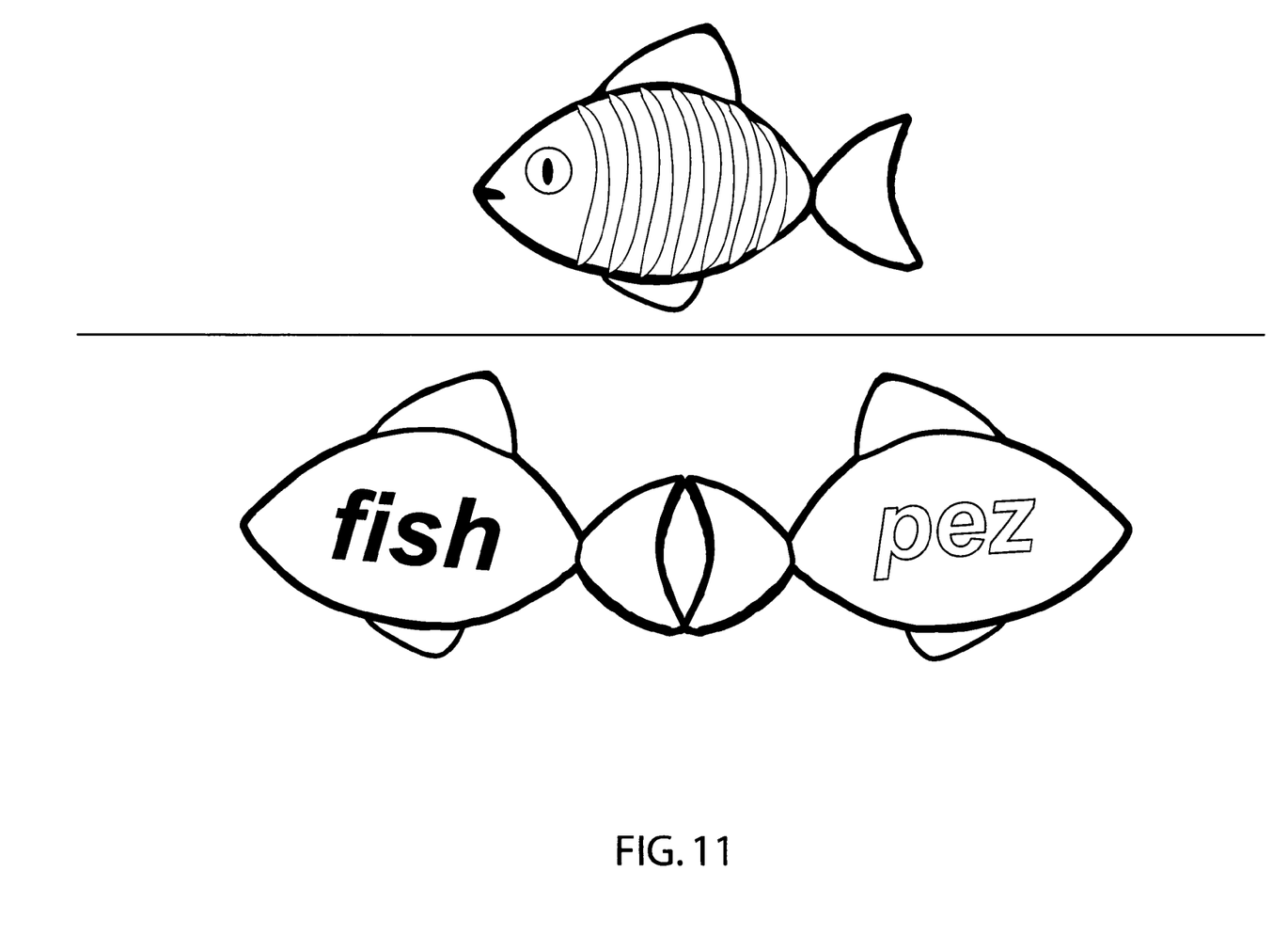
FIG. 11 is a picture of a second toy embodiment of the present invention.
Figure 12:
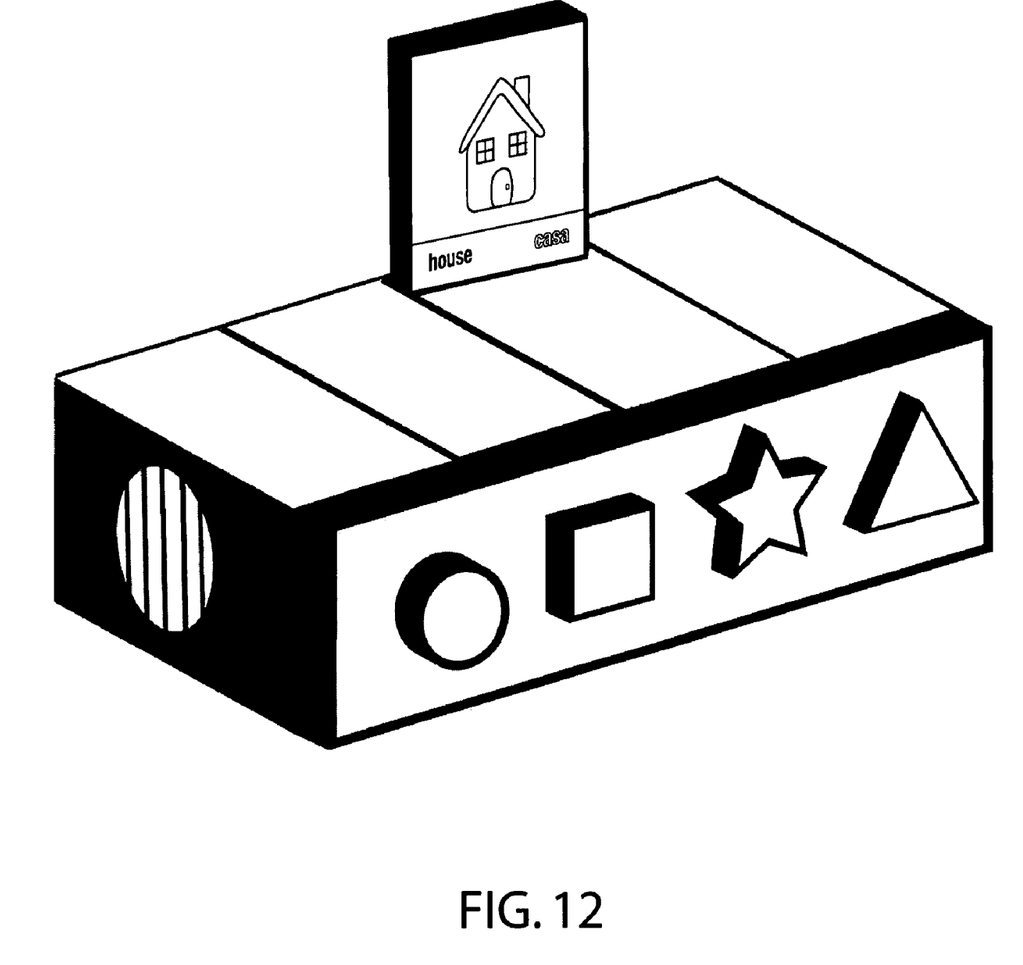
FIG. 12 is a picture of a pop-up toy embodiment of the present invention.
Figure 13:
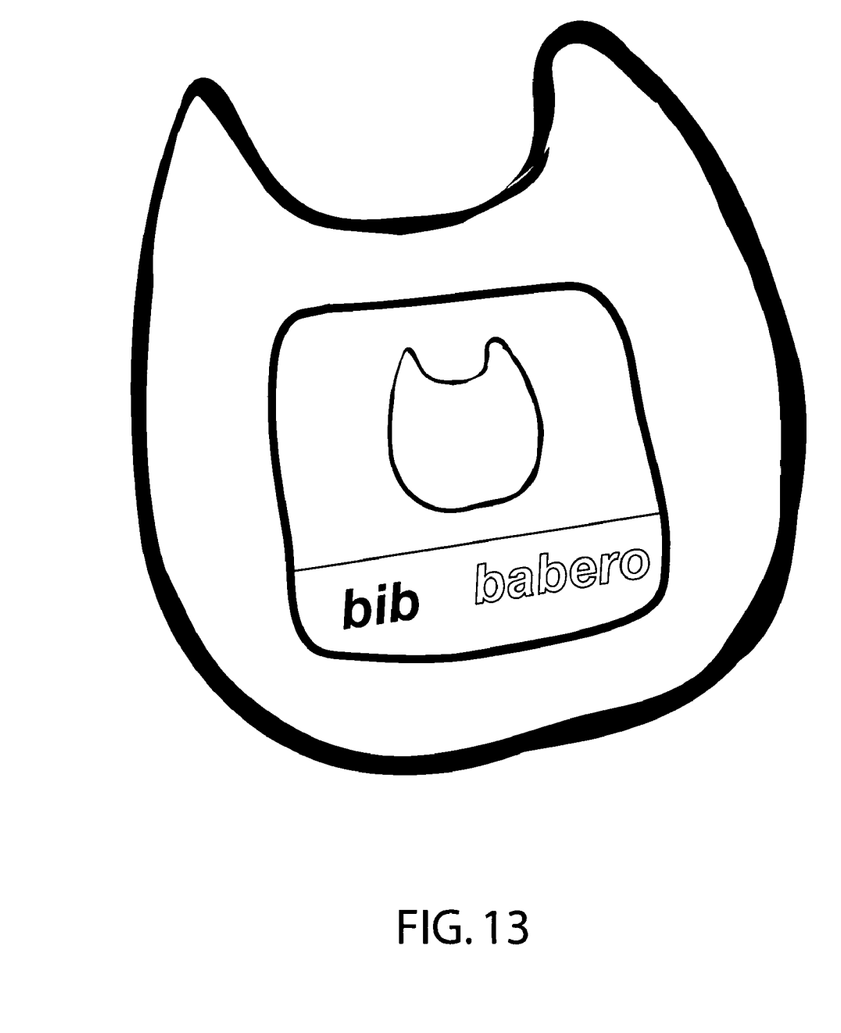
FIG. 13 is a picture of an apparel or baby's bib embodiment of the present invention.

The method of the present invention envisions the consistent presentation of a number of items for children that include similar images for the reinforcement of the bilingual presentation. FIGS. 6-8 disclose electronic book embodiments. FIG. 9 discloses a puzzle embodiment. FIGS. 10-12 disclose toy embodiments and FIG. 13 discloses an apparel or baby's bib embodiment.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method for presenting a first language and a second language, for a plurality of things, including the steps of:
    providing a series of video images of said things with an audiovisual device;
    providing an audio depiction, in said first language, of a word corresponding to the thing in said video image while providing, as part of said video image;
    subsequently, providing an audio depiction, in said second language, of a word corresponding to the thing in said video image while providing, as part of said video image;
    during said steps of providing an audio depiction, providing a video depiction of the spelling of said word in said first language and in said second language;
    providing printed material which includes images of said things, said spelling of said word in said first language and said spelling of said word in said second language;
    wherein said first language and said second language are presented with equal emphasis so that either said first language or said second language can be taught by said method;
    wherein said step of providing a series of video images further provides a video image of a single thing which continues during said step of presenting an audio depiction in a first language and said step of presenting an audio depiction in a second language;
    wherein, for each said thing, said spelling of said word in said first language and said spelling of said word in a second language is presented on the same color background;
    wherein said same color background changes as said thing of said video image changes;
    wherein, for each said thing, said printed material presents said spellings of said words in a color background which matches said color background in said video image; and
    wherein said printed material includes a slider with said image of said thing which can selectively expose said spelling of said word in said first language or said spelling of said word in said second language.

2. The method of presenting a first language and a second language of claim 1 further including a step of providing a coloring book with the images presented in the same order as said video image, with corresponding spelling of said words in said first language and said second language.

3. The method of presenting a first language and a second language of claim 1 further including the step of providing a placemat with images and spellings of said words in said first language and said second language substantially corresponding to images and spellings presented in said coloring book.

* * * * *